US011125353B2

United States Patent
Le et al.

(10) Patent No.: US 11,125,353 B2
(45) Date of Patent: Sep. 21, 2021

(54) PNEUMATIC LOST MOTION/BINARY DEVICE SYSTEM AND METHOD

(71) Applicant: Fluidmaster, Inc., San Juan Capistrano, CA (US)

(72) Inventors: Tuan Le, Fountain Valley, CA (US); Joseph Han, Irvine, CA (US)

(73) Assignee: FLUIDMASTER, INC., San Juan Capistrano, CA (US)

( * ) Notice: Subject to any disclaimer, the term of this patent is extended or adjusted under 35 U.S.C. 154(b) by 0 days.

(21) Appl. No.: 16/151,257

(22) Filed: Oct. 3, 2018

(65) Prior Publication Data

US 2019/0101226 A1    Apr. 4, 2019

Related U.S. Application Data

(60) Provisional application No. 62/567,728, filed on Oct. 3, 2017.

(51) Int. Cl.

| F16K 15/14  | (2006.01) |
|---|---|
| F16K 31/126 | (2006.01) |
| F16K 27/00  | (2006.01) |
| F16K 7/17   | (2006.01) |
| F16K 11/02  | (2006.01) |

(52) U.S. Cl.
CPC ............ *F16K 31/1266* (2013.01); *F16K 7/17* (2013.01); *F16K 11/022* (2013.01); *F16K 27/00* (2013.01); *F16K 15/145* (2013.01); *Y10T 137/784* (2015.04); *Y10T 137/7895* (2015.04)

(58) Field of Classification Search
CPC ...... F16K 15/145; F16K 31/1266; F16K 7/17; Y10T 137/3149; Y10T 137/7784; Y10T 137/7786; Y10T 137/7787; Y10T 137/7895; Y10T 137/7896
See application file for complete search history.

(56) References Cited

U.S. PATENT DOCUMENTS 3,417,775 A * 12/1968 Smith ................... F16K 24/06
                                                          137/218
3,850,190 A * 11/1974 Carlson ................ F16K 15/144
                                                          137/218

(Continued)

OTHER PUBLICATIONS

International Search Report and Written Opinion for International Application No. PCT/US2018/054259, dated Jan. 17, 2019, 11 pages.

*Primary Examiner* — Robert K Arundale
(74) *Attorney, Agent, or Firm* — Greenberg Traurig, LLP

(57) ABSTRACT

Some embodiments include an assembly with an inlet housing enclosing an outlet housing that includes an inlet. The outlet housing includes an outlet port and a channel or aperture coupled to an outlet and apertures coupled to atmosphere. A moveable or flexible member is positioned in the inlet housing coupled to the outlet housing, and can deform, flex and/or move based on a flow and/or pressure of fluid from the inlet. Based on the flow and/or pressure of fluid from the inlet, the moveable or flexible member can reversibly move from a first position to a second position and/or from a second position to a first position. The first position is characterized by the moveable or flexible member being coupled to, proximate to, sealed to the aperture, and the second position is characterized by the moveable or flexible member being moved away from the aperture.

12 Claims, 5 Drawing Sheets

(56) References Cited

U.S. PATENT DOCUMENTS

| | | | |
|---|---|---|---|
| 3,905,392 A * | 9/1975 | Gray | F16K 15/148 |
| | | | 137/557 |
| 4,080,981 A | 3/1978 | Stewart | |
| 4,726,390 A * | 2/1988 | Franklin | E03C 1/104 |
| | | | 137/218 |
| 9,291,276 B2 | 3/2016 | Keren | |
| 2004/0182438 A1 | 9/2004 | Kobes | |
| 2012/0323379 A1 | 12/2012 | Robertson, III | |
| 2016/0178076 A1 | 6/2016 | Cellemme | |

\* cited by examiner

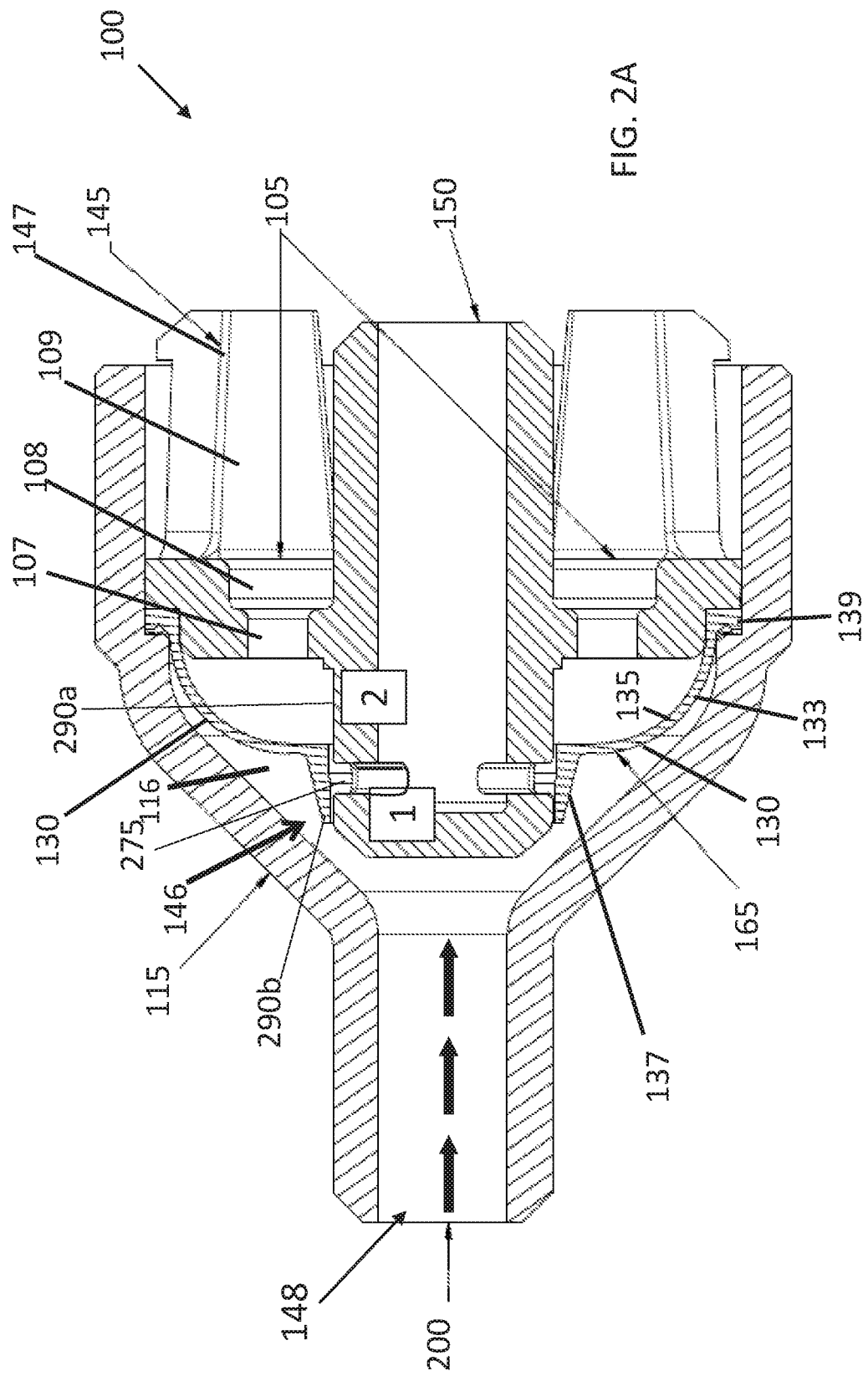

PNEUMATIC LOST MOTION/BINARY DEVICE SYSTEM AND METHOD

RELATED APPLICATIONS

This application claims priority to U.S. provisional application Ser. No. 62/567,728, filed on Oct. 3, 2017, the entire contents of which are incorporated herein by reference.

BACKGROUND

Conventional fluid valve systems generally fail to recover or reuse motion or energy that can be converted to useful energy or motion, and/or fail to contribute to or provide a valve function. For example, valve systems are needed that use motion or action to deliver a pulse of pressurized air for use in operation and/or provide a one-way type of valve.

SUMMARY OF THE INVENTION

Some embodiments include an assembly comprising an inlet housing at least partially enclosing an outlet housing. In some embodiments, the inlet housing includes an inlet and the outlet housing includes an outlet port and a channel or aperture coupled to an outlet and apertures coupled to atmosphere. Some embodiments include a moveable or flexible member positioned in the inlet housing coupled to at least a portion of the outlet housing. In some embodiments, the moveable or flexible member configured and arranged to deform, flex and/or move based on a flow and/or pressure of fluid from the inlet. In some embodiments, based at least in part on the flow and/or pressure of fluid from the inlet, a portion of the moveable or flexible member is configured to reversibly move from a first position to a second position and/or from a second position to a first position. In some embodiments, the first position is characterized by at least a portion of the moveable or flexible member being at least partially at least one of coupled to, proximate to, sealed to the at least one aperture. Further, in some embodiments, the second position is characterized by at least a portion of the moveable or flexible member being moved away from the at least one aperture.

In some embodiments, the outlet port is positioned substantially at the center of the assembly, and the apertures are located around a surface in a substantially transverse direction relative to the outlet port, and/or are radially positioned with respect to the outlet port.

In some further embodiments, the moveable or flexible member comprises a base end at one end and seated end at an opposite end, and a flexible diaphragm extending between the base end and seated end.

In some embodiments, the base end comprises a moveable body comprising a top side and a coupled seal side, where the moveable body is configured to be positioned on top or over the at least one aperture to at least partially or fully seal the at least one aperture.

In some embodiments, the movement of the base is facilitated by a coupling of the seated end of the flexible member being secured into a space or gap formed between portions of the inlet and outlet housing. In some embodiments, the seated end comprises a notch. In some further embodiments, the notch is configured to provide a strain relief and/or facilitate movement, deformation, and/or flexing of at least a portion of the moveable or flexible member.

Some other embodiments are configured and arranged to be in an operational state comprising fluid path openings along a side wall of an aperture of the outlet housing, allowing compressed air to flow through the outlet of the outlet housing. Some further embodiments, are configured and arranged to be in an operational state comprising a leak path between an inner edge of the moveable or flexible member and the outlet port of the outlet housing at the second position, where the compressed air can be vented out through the outlet, causing an incoming pressure to drop.

Some embodiments include a valve assembly comprising a flexible member positioned in an inlet housing coupled to at least a portion of an outlet housing. In some embodiments, the flexible member comprises a diaphragm extending between a base end and a seated end, the seated end positioned in a cavity comprising sides or portions of the inlet and outlet housing. Some embodiments include an aperture fluidly coupled to an outlet. In some embodiments, the flexible member is configured and arranged to control a flow of fluid or a pressure of fluid between an inlet of the inlet housing and an outlet of the outlet housing.

In some embodiments, based at least in part on a flow and/or pressure of fluid, a portion of the flexible member is configured to reversibly move from a first position to a second position and/or from a second position to a first position. In some embodiments, the first position is characterized by at least a portion of the base end being at least partially at least one of coupled to, proximate to, sealed to the aperture, and the second position is characterized by the base end being away from the aperture. In some embodiments, the seated end comprises a notch. In some embodiments, the notch is configured to provide a strain relief and/or facilitate movement, deformation, and/or flexing of at least a portion of the flexible member.

Some embodiments can be in an operational state comprising fluid path openings along a side wall of an aperture of the outlet housing, allowing compressed air to flow through the outlet of the outlet housing. Some further embodiments are configured and arranged to be in an operational state comprising a leak path between an inner edge of the flexible member and an aperture of the outlet housing at the second position, where compressed air can be vented out through the aperture, causing an incoming pressure to drop.

In some embodiments, the outlet housing in the region of or adjacent to the aperture can include one or more transition regions or steps. In some further embodiments, the outlet housing in the region of or adjacent to the aperture can include one or more inwardly guided surfaces that can surround at least a portion of the aperture.

Some embodiments of the invention include a valve operation method comprising providing a pneumatic valve including at least one leak path positioned between at least one valve element and an aperture coupled to ambient atmosphere, and operating the pneumatic valve to enable pressure relief vented through the at least one leak path.

Some embodiments include a fluid control method comprising providing a valve assembly including a pneumatic valve including at least one leak path positioned between at least one valve element and an aperture coupled to ambient atmosphere. Further, some embodiments include providing a source of pressurized air actuated by a user actuating a pneumatic button by the user pushing on the button, where a drop of air pressure due to the at least one leak path can remove the control of the user on the work done by at least one other source. In some embodiments, if a user continues to push the pneumatic button, no further compressed air pressure will be maintained through the valve assembly.

DESCRIPTION OF THE DRAWINGS

FIG. 2A is a cross-sectional view of a valve assembly including the beginning of an operational state with compressed air flowing according to at least one embodiment of the invention.

DETAILED DESCRIPTION

Figure 1:
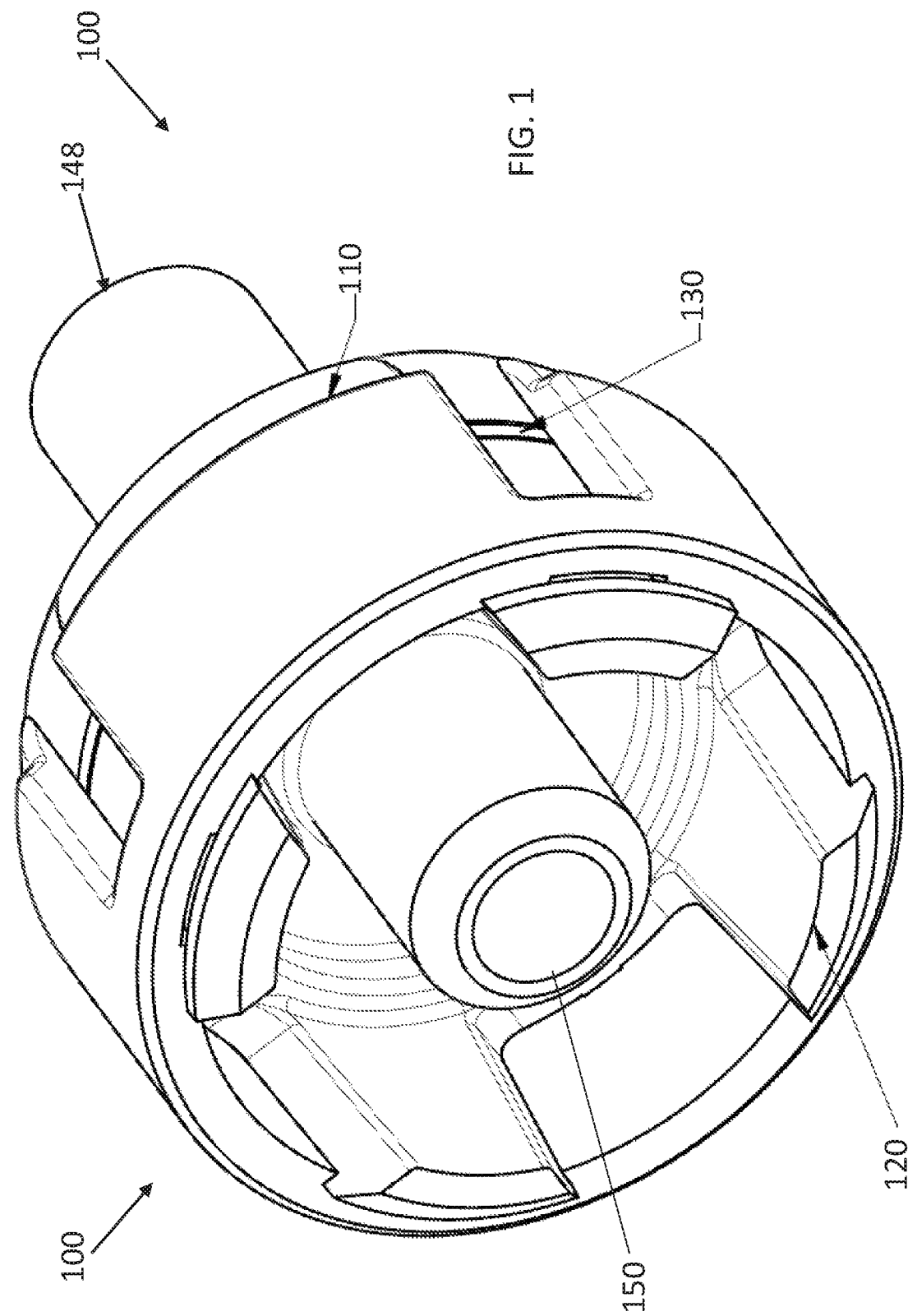
FIG. 1 illustrates a perspective view of a valve assembly in accordance with some embodiments of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Some embodiments provide a system, apparatus and method to use a lost motion or binary action to create a momentary motion of a fluid to do some work. Some embodiments provide a binary or lost motion valve activation. Some embodiments comprise a one-way valve.

Some embodiments of the invention provide a substantially binary way to direct fluid (e.g., air, gas, liquid, or a combination thereof) from a source such as a pneumatic button to another source that requires a force to act on the other source. For example, FIG. 1 illustrates a perspective view of a valve assembly 100 in accordance with some embodiments of the invention. In some embodiments, the valve assembly 100 can comprise a diverter body 110, and a coupled or integrated diverter cover 120. Further, an internally positioned diaphragm 130 can be fluidly coupled to a fluid inlet 148 and a fluid outlet 150 that can be variably fluidly coupled to the fluid inlet 148 as well.

In one non-limiting embodiment as shown in FIG. 2A, two housings and a flexible member provide air chambers. In some embodiments, the assembly 100 comprises an inlet housing 115 which has an inlet port (fluid inlet 148) for incoming air or other fluid. Further, in some embodiments, the assembly 100 comprises an outlet housing 145 and also includes an outlet port 150 substantially at the center of the assembly 100, and multiple vent apertures 105 located around a surface in a substantially transverse direction relative to the outlet port 150, and/or radially positioned with respect to the outlet port 150.

In some embodiments of the invention, the outlet port 150 of the outlet housing 145 is closed at the entrance surface and has multiple openings along its side wall near the entrance. For example, some embodiments include a flexible member 130 positioned in the assembly 100 between a port 107 and outlet 150 of the outlet housing 145, and the outer housing 115 and fluid inlet 148. In some embodiments, the outlet housing 145 in the region of or adjacent to the port 107 can include one or more transition regions or steps 108 from the port 107, and/or one or more inwardly guided surfaces 147 that can surround at least a portion of the aperture 109.

Figure 2B:
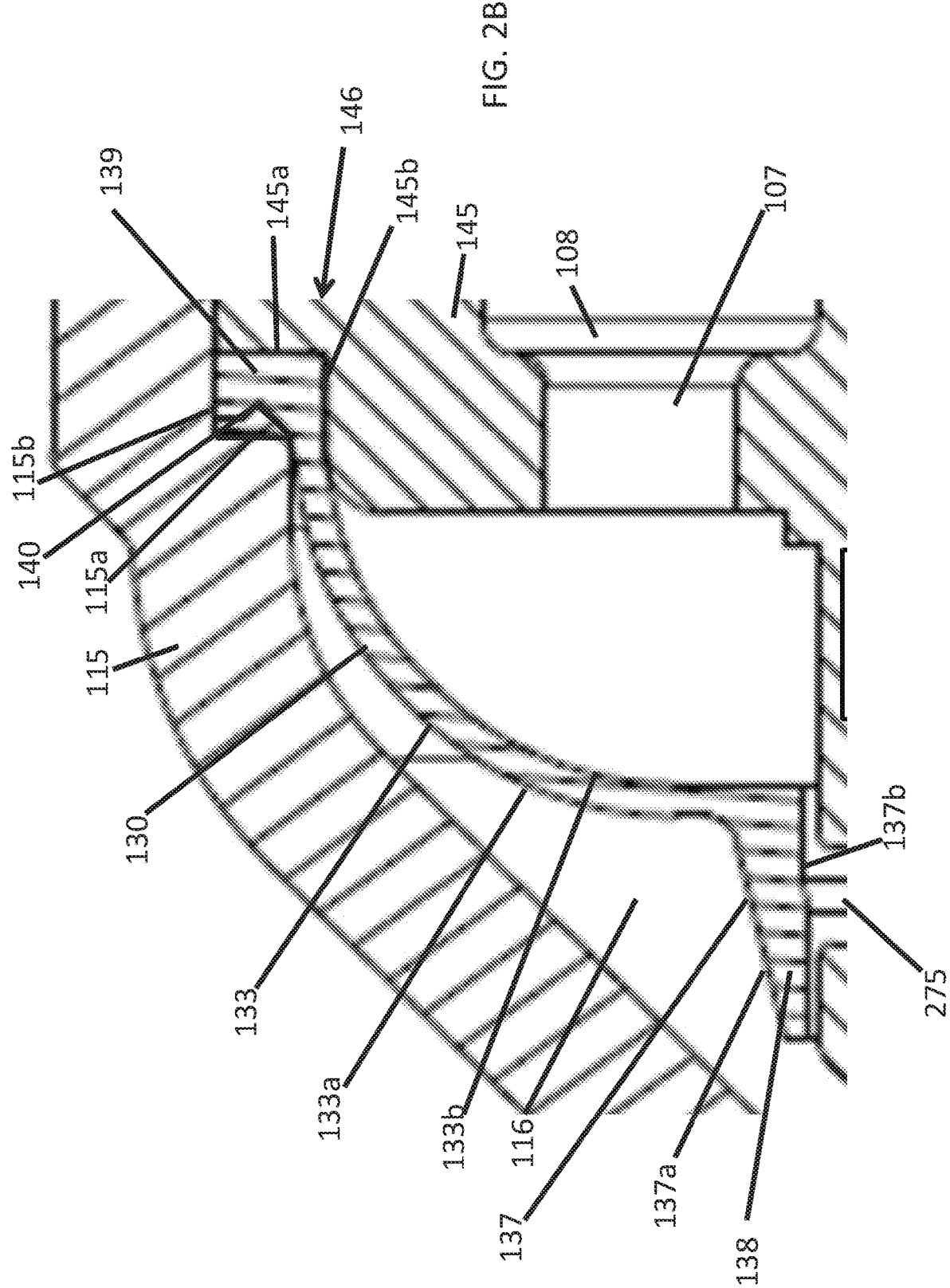
FIG. 2B is a close-up cross-sectional view of a diaphragm of the valve assembly according to some embodiments of the invention.

FIG. 2A is a cross-sectional view of a valve assembly including the beginning of an operational state with compressed air flowing according to at least one embodiment of the invention. FIG. 2B is a close-up cross-sectional view of a diaphragm of the valve assembly according to some embodiments of the invention. In some embodiments, the flexible member 130 comprises a base end 138 at one end and seated end 139 at an opposite end. A moveable and/or flexible diaphragm 133 of the flexible member 130 extends between the base end 138 at one end and seated end 139. In some embodiments, the diaphragm 133 can comprise an outer side 133a facing the inlet housing 115 and an inner side 133b facing the port 107 of the outlet housing 145.

In some embodiments, the base end 138 can comprise a moveable body 137 comprising a top side 137a and a coupled seal side 137b. In some embodiments, the front end 146 of the outlet housing 145 includes apertures 275. In some embodiments, based on a state of deformation or position of the flexible member 130 including the diaphragm 133, the apertures 275 can enable a fluid coupling of the inlet 148 and the outlet 150. For example, as shown in FIGS. 2A and 2B, in some embodiments, the moveable body 137 of the base end 138 can be positioned on top or over the aperture 275 (shown as the first position 290b). In this arrangement, the seal side 137b can at least partially or fully seal the aperture 275, thereby preventing passage of fluid (e.g., such air) through the aperture 275. Further, in this instance, the coupling of the base end 138 with the aperture 275 can prevent or reduce fluid (e.g., such as air) from traveling into the assembly 100 from the inlet 148, and through the aperture 275 and out through the outlet 150.

Figure 3:
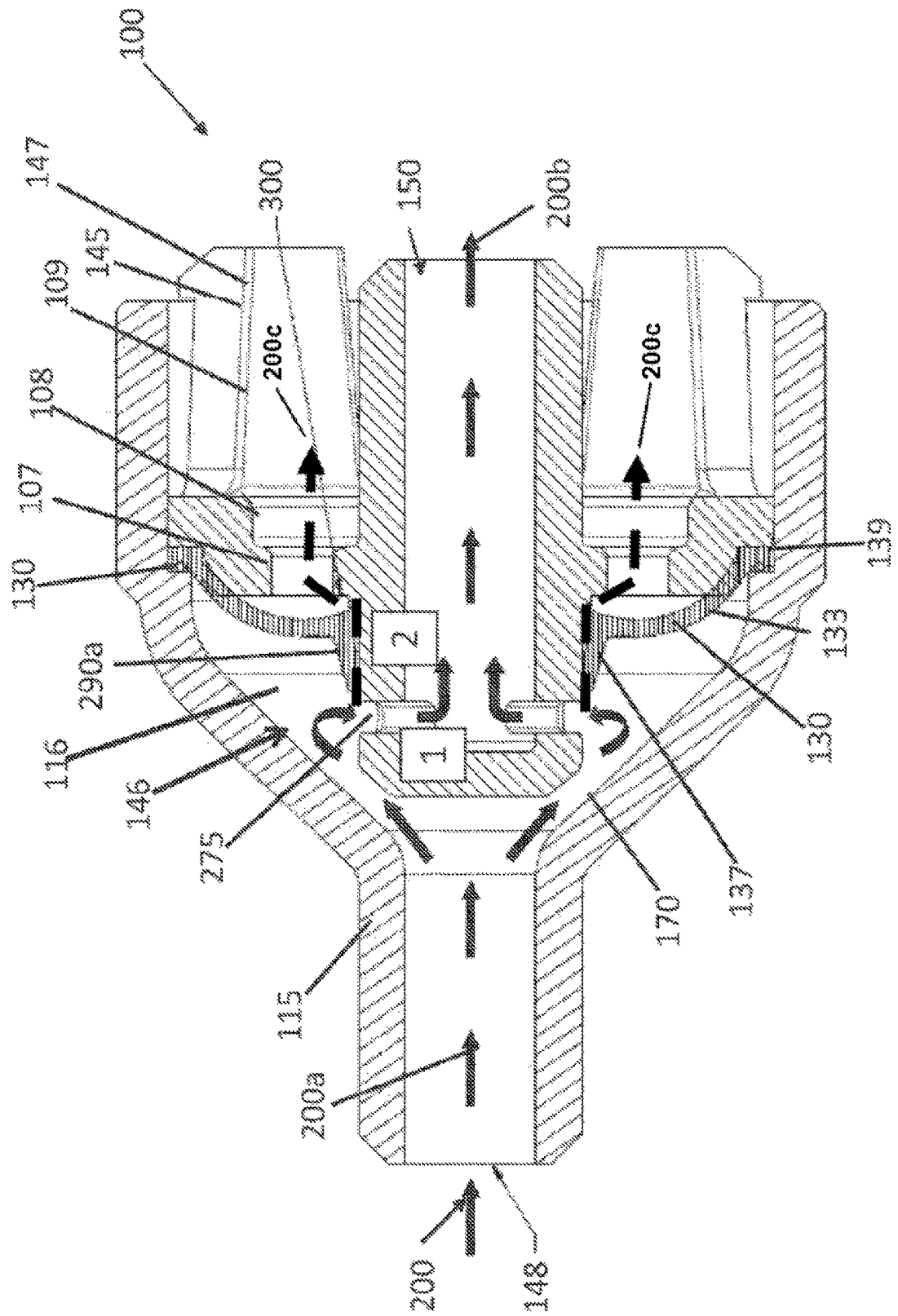
FIG. 3 is a cross-sectional view of a valve assembly in an operational state with compressed air flowing and diaphragm actuated and moved from a first position to a second position according to at least one embodiment of the invention.

In some embodiments, when compressed air (200) is delivered to the inlet port 148 of the inlet housing 115, the air chamber 116 formed by the inlet housing 115, the outlet housing 115 and the flexible member 130 can be pressurized, causing at least a portion of the flexible member 130 to deform. For example, FIG. 3 is a cross-sectional view of a valve assembly 100 in an operational state with compressed air flowing (fluid 200 with flow or pressure 200a), and diaphragm 133 actuated and moved from a first position 290b to a second position 290a according to at least one embodiment of the invention. In some embodiments, based on a flow or pressure 200a of fluid 200 entering the assembly 100, at least a portion of the flexible member 130 can move, deform, and/or flex so that at least a portion of the base 138 can move over and/or away from at least a portion of the aperture 275. In some embodiments, the flexible member 130 can move away from the position 290b to the second position 290a. In this instance, the seal side 137b can move away from the aperture 275, thereby enabling the passage of fluid (e.g., such air). In this instance, the position of the base end 138 away from the aperture 275 enable fluid (e.g., such as air) to travel into the assembly 100 from the inlet 148 (flow 200a), and through the aperture 275 from passageway 170, and out through the outlet 150 forming an exit flow 200b.

In some embodiments, the movement of the base 238 can be facilitated by a coupling of the seated end 139 of the flexible member 130 which can be secured into a space or gap formed between portions of the inlet housing 115 and portions of the outlet housing 145 adjacent or near the front end 146. For example, in some embodiments, the seated end 139 can be positioned between the side 145a and ledge 145b of the outlet housing 145, and the ledge 115a and side 115b of the inlet housing 115. In some further embodiments, the seated end 139 can comprise a notch 140. In some embodiments, the notch 140 can provide a strain relief and/or can enable movement, deformation, and/or flexing of at least a portion of the flexible member 130 including the diaphragm 133.

In some embodiments, during the operational state of the assembly shown in FIG. 3, air paths are provided at the openings 300 along the side wall of the port 107 of the outlet housing 145, allowing compressed air to flow through the outlet 105 of the outlet housing 145 and to be delivered to another source to do some work (e.g., to move a diaphragm). Further, a small leak path 200c can be created between the inner edge of the flexible member and the outlet port of the outlet housing at the second position 290a. Due to this leak path, the compressed air (200) can be vented out through the outlet 105 on the outlet housing 145, causing the incoming pressure (flow and pressure 200a) to drop quickly in some embodiments.

In one example operational embodiment of the invention, if the pressurized air (200) is supplied by a pneumatic button by an user's pushing on the button, the quick drop of air pressure due to the leak at the second position 290a of the assembly 100 can remove the control of the user on the work done by the other source (e.g., such as to deform a diaphragm). In this instance, if the user continues to hold on the pneumatic button, no further compressed air pressure will be maintained through the assembly. This embodiment can enable the user to actuate the button and a coupled device such as a valve, while preventing the valve from continuing to be actuated even if the user continues to actuate the button. Accordingly, if the valve is a flush valve, the flush volumes can be better controlled because the user cannot increase flush volumes by holding down the button. In some embodiments, the pneumatic button can be located remotely from the device(s) it actuates, providing greater flexibility in locating the button and other system components.

Figure 4:
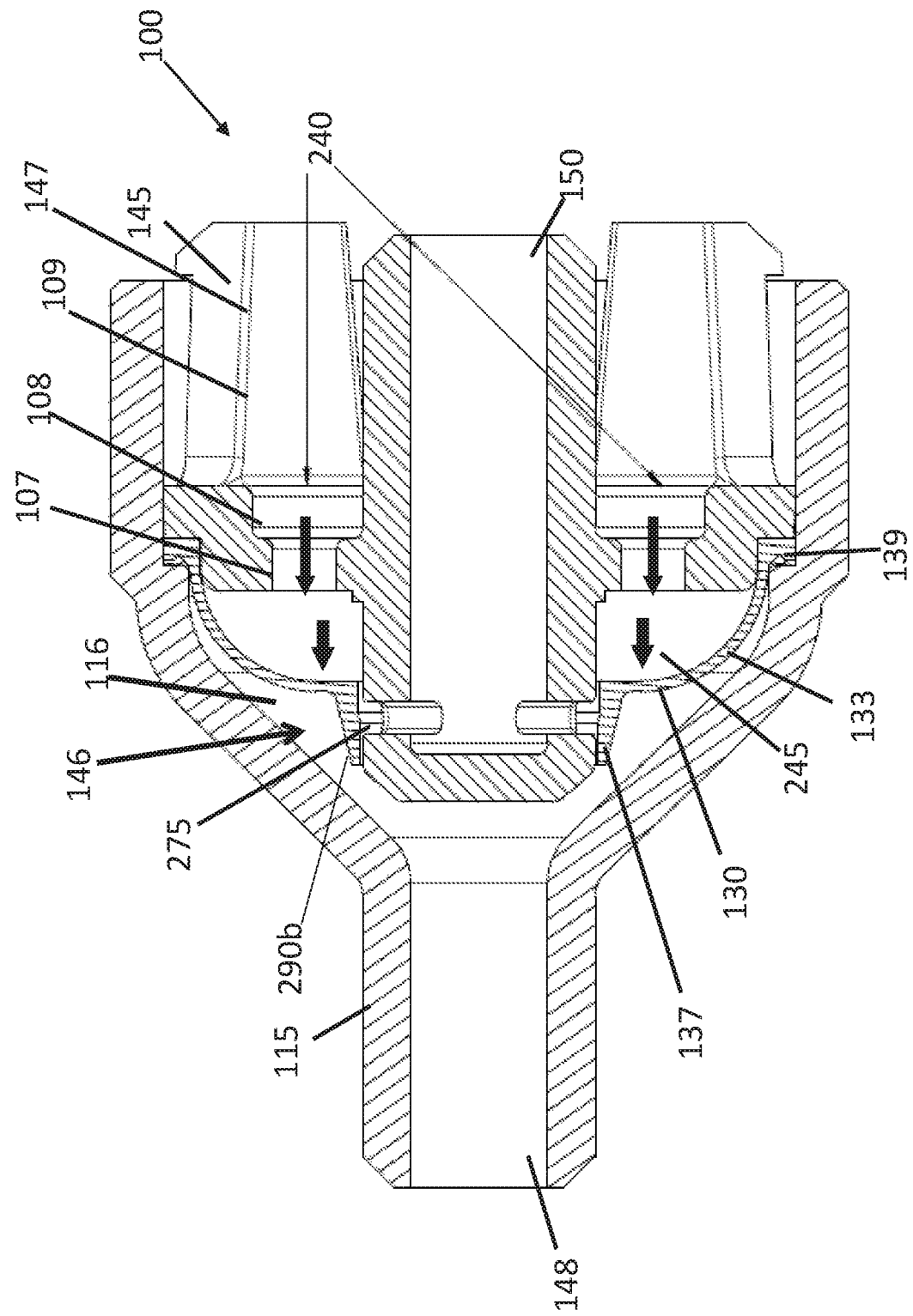
FIG. 4 is a cross-sectional view of a valve assembly following the operational state representation of FIG. 3 with atmospheric air entering the outlet end and diaphragm moved to a first position according to at least one embodiment of the invention

FIG. 4 is a cross-sectional view of a valve assembly 100 following the operational state representation of FIG. 3 with atmospheric air 240 entering the port 107 and traveling towards the diaphragm 133, and where the diaphragm 133 is moved to a first position 290b from the second position 290a by flow or pressure 245 according to some embodiments of the invention. In some embodiments, when there is no compressed air 200 being delivered to the inlet port 148 of the inlet housing 115, or a reduced flow or pressure 200a, the air chamber 116 formed by the inlet housing 115, the outlet housing 115 and the flexible member 130 can be depressurized, causing at least a portion of the flexible member 130 to deform.

For example, in some embodiments, the diaphragm 133 is actuated and moved from a second position 290a to a first position 290b. In some embodiments, based on a flow or pressure 200a of fluid 200 entering the assembly 100 (which may be no flow or fluid at atmospheric pressure, at least a portion of the flexible member 130 can move, deform, and/or flex so that at least a portion of the base 138 can move over and/or towards at least a portion of the aperture 275. In this instance, the seal side 137b can move over the aperture 275, thereby reducing, limiting, or preventing the passage of fluid (e.g., air). In this instance, the position of the base end 138 over the aperture 275 can prevent or reduce fluid (e.g., air) traveling into the assembly 100 from the inlet 148 (flow 200a), and through the aperture 275 from passageway 170.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the description and figures, and/or claims below.

The invention claimed is:
1. An assembly comprising:
an inlet housing at least partially enclosing an outlet housing;
wherein the inlet housing includes an inlet; and
wherein the outlet housing includes a channel comprising at least one aperture and an outlet port;
a moveable or flexible member positioned in the inlet housing coupled to at least a portion of the outlet housing;
wherein the moveable or flexible member is configured to deform, flex, and/or move based on a flow and/or pressure of a fluid from the inlet; and
wherein a portion of the moveable or flexible member is configured to reversibly move from a first position to a second position and/or from a second position to a first position based at least in part on the flow and/or pressure of the fluid from the inlet; and
a leak path coupled to atmosphere;
wherein in the first position at least a portion of the moveable or flexible member at least partially seals the at least one aperture;
wherein in the second position at least a portion of the moveable or flexible member is moved away from the at least one aperture;
wherein in the second position the assembly is configured to allow the fluid from the inlet to flow through the at least one aperture, the outlet port, and the leak path;
wherein the moveable or flexible member comprises a base end at one end, a seated end at an opposite end, and a flexible diaphragm extending between the base end and the seated end; and
wherein the base end is located in a space formed between the inlet and outlet housing.

2. The assembly of claim 1,
wherein the outlet port is positioned substantially at the center of the assembly, and
wherein the at least one aperture is located around a channel surface in a substantially transverse direction relative to the outlet port.

3. The assembly of claim 1, wherein the base end comprises a moveable body comprising a top side and a coupled seal side, the moveable body being configured to be positioned on top or over the at least one aperture to at least partially or fully seal the at least one aperture.

4. The assembly of claim 1, wherein the seated end comprises a notch.

5. An assembly comprising: an inlet housing at least partially enclosing an outlet housing; wherein the inlet housing includes an inlet; and wherein the outlet housing includes a channel comprising at least one aperture and an outlet port; a moveable or flexible member positioned in the inlet housing coupled to at least a portion of the outlet housing, wherein the moveable or flexible member is configured to deform, flex, and/or move based on a flow and/or pressure of a fluid from the inlet; and wherein a portion of the moveable or flexible member is configured to reversibly move from a first position to a second position and/or from a second position to a first position based at least in part on the flow and/or pressure of the fluid from the inlet; and a leak path coupled to atmosphere; wherein in the first position at least a portion of the moveable or flexible member at least partially seals the at least one aperture wherein in the second position at least a portion of the moveable or flexible member is moved away from the at least one aperture; wherein in the second position the assembly is configured to allow the fluid from the inlet to flow through the at least one aperture, the outlet port, and the leak path; wherein the moveable or flexible member comprises a base end at one end, a seated end at an opposite end, and a flexible diaphragm extending between the base end and the seated end; wherein the seated end comprises a notch; and wherein the notch is configured to provide a strain relief and/or facilitate movement, deformation, and/or flexing of at least a portion of the moveable or flexible member.

6. The assembly of claim 5, wherein the at least one aperture of the outlet housing provides at least one path for the fluid from the inlet to flow through the outlet port.

7. The assembly of claim 5, wherein the fluid from the inlet venting to atmosphere through the leak path causes the flexible member to move from the second position to the first position.

8. A valve assembly comprising:
a flexible member positioned in an inlet housing coupled to at least a portion of an outlet housing, the flexible member extending between a base end and a seated end, the seated end positioned in a cavity comprising sides or portions of the inlet and outlet housing;
an aperture fluidly coupled to an outlet, the flexible member configured and arranged to control a flow of a fluid and/or a pressure of the fluid,
wherein based at least in part on the flow and/or the pressure of the fluid, a portion of the flexible member is configured to move from a first position to a second position and/or from a second position to a first position,
wherein in the first position at least a portion of the base end is at least partially at least one of coupled to, proximate to, or sealed to the aperture, and
wherein in the second position the base end is positioned away from the aperture; and
a leak path coupled to atmosphere,
wherein in the second position the valve assembly is configured to allow the fluid from the inlet to flow through at least one of the aperture, the outlet port, and the leak path,
wherein the seated end comprises a notch, and
wherein the notch is configured to provide a strain relief and/or facilitate movement, deformation, and/or flexing of at least a portion of the flexible member.

9. The valve assembly of claim 8, configured and arranged to be in an operational state comprising fluid path openings along a side wall of an aperture of the outlet housing, allowing compressed air to flow through the outlet of the outlet housing.

10. The valve assembly of claim 8, wherein the fluid from the inlet venting to atmosphere through the leak path causes the flexible member to move from the second position to the first position.

11. The valve assembly of claim 10, wherein the outlet housing in the region of or adjacent to the aperture includes one or more transition regions or steps.

12. The valve assembly of claim 10, wherein the outlet housing in the region of or adjacent to the aperture includes one or more inwardly guided surfaces that surrounds at least a portion of the aperture.

* * * * *

UNITED STATES PATENT AND TRADEMARK OFFICE
CERTIFICATE OF CORRECTION

PATENT NO. : 11,125,353 B2
APPLICATION NO. : 16/151257
DATED : September 21, 2021
INVENTOR(S) : Tuan Le et al.

It is certified that error appears in the above-identified patent and that said Letters Patent is hereby corrected as shown below:

In the Claims

Claim 5, Column 7, Lines 13-40:
The text currently reads "An assembly comprising: an inlet housing at least partially enclosing an outlet housing; wherein the inlet housing includes an inlet; and wherein the outlet housing includes a channel comprising at least one aperture and an outlet port; a moveable or flexible member positioned in the inlet housing coupled to at least a portion of the outlet housing, wherein the moveable or flexible member is configured to deform, flex, and/or move based on a flow and/or pressure of a fluid from the inlet; and wherein a portion of the moveable or flexible member is configured to reversibly move from a first position to a second position and/or from a second position to a first position based at least in part on the flow and/or pressure of the fluid from the inlet; and a leak path coupled to atmosphere; wherein in the first position at least a portion of the moveable or flexible member at least partially seals the at least one aperture wherein in the second position at least a portion of the moveable or flexible member is moved away from the at least one aperture; wherein in the second position the assembly is configured to allow the fluid from the inlet to flow through the at least one aperture, the outlet port, and the leak path; wherein the moveable or flexible member comprises a base end at one end, a seated end at an opposite end, and a flexible diaphragm extending between the base end and the seated end; wherein the seated end comprises a notch; and wherein the notch is configured to provide a strain relief and/or facilitate movement, deformation, and/or flexing of at least a portion of the moveable or flexible member."

But should read:
-- An assembly comprising:
    an inlet housing at least partially enclosing an outlet housing;
    wherein the inlet housing includes an inlet; and
    wherein the outlet housing includes a channel comprising at least one aperture and an outlet port;
    a moveable or flexible member positioned in the inlet housing coupled to at least a portion of the outlet housing;

Signed and Sealed this
Sixteenth Day of November, 2021

Drew Hirshfeld
*Performing the Functions and Duties of the*
*Under Secretary of Commerce for Intellectual Property and*
*Director of the United States Patent and Trademark Office* wherein the moveable or flexible member is configured to deform, flex, and/or move based on a flow and/or pressure of a fluid from the inlet; and wherein a portion of the moveable or flexible member is configured to reversibly move from a first position to a second position and/or from a second position to a first position based at least in part on the flow and/or pressure of the fluid from the inlet; and a leak path coupled to atmosphere;

wherein in the first position at least a portion of the moveable or flexible member at least partially seals the at least one aperture;

wherein in the second position at least a portion of the moveable or flexible member is moved away from the at least one aperture;

wherein in the second position the assembly is configured to allow the fluid from the inlet to flow through the at least one aperture, the outlet port, and the leak path;

wherein the moveable or flexible member comprises a base end at one end, a seated end at an opposite end, and a flexible diaphragm extending between the base end and the seated end;

wherein the seated end comprises a notch; and wherein the notch is configured to provide a strain relief and/or facilitate movement, deformation, and/or flexing of at least a portion of the moveable or flexible member. --